Figure 19:
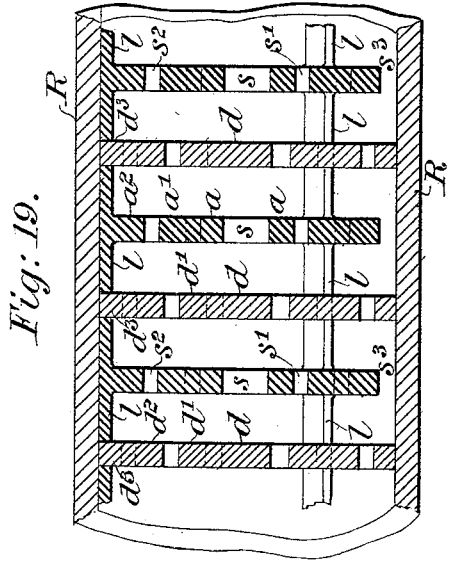

(No Model.) 6 Sheets—Sheet 1.
A. G. MEEZE.
APPARATUS FOR HEATING AND COOLING FLUIDS.
No. 373,564. Patented Nov. 22, 1887.
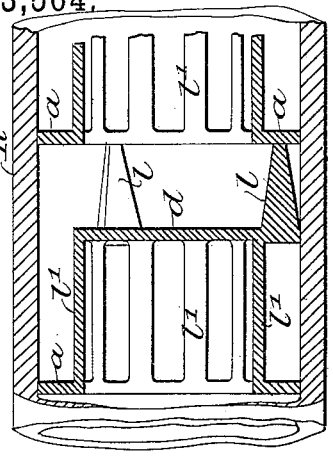
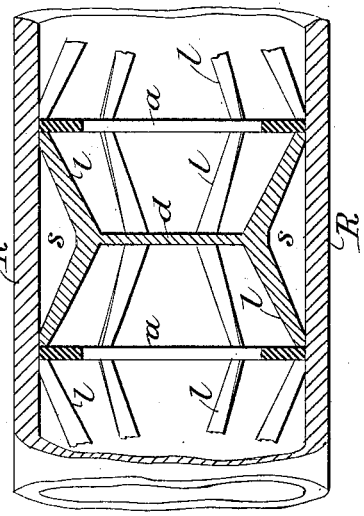
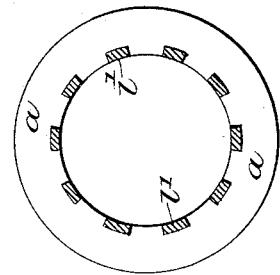
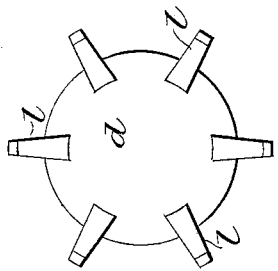
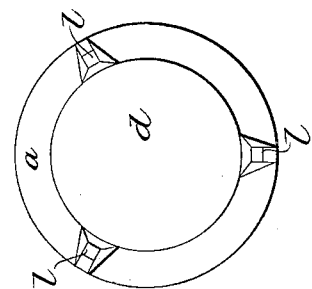
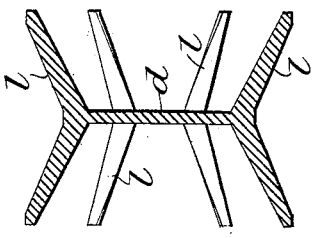
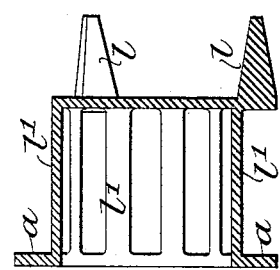
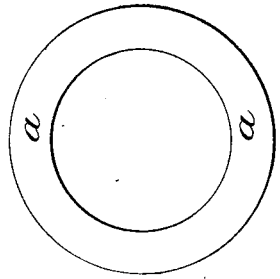
Witnesses:
Emil Herter
C. L. Sundgren
Inventor:
Arthur G. Meeze
By attorneys (No Model.) 6 Sheets—Sheet 2.
A. G. MEEZE.
APPARATUS FOR HEATING AND COOLING FLUIDS.
No. 373,564. Patented Nov. 22, 1887.
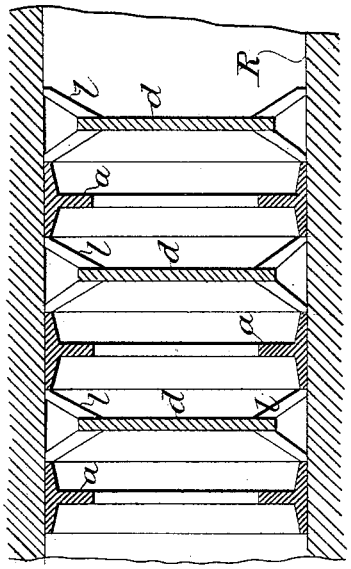
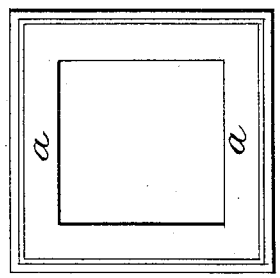
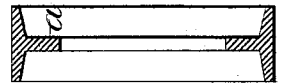
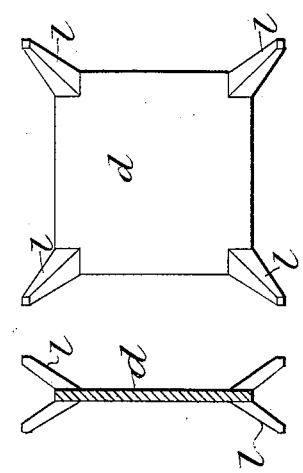

(No Model.) 6 Sheets—Sheet 3.
A. G. MEEZE.
APPARATUS FOR HEATING AND COOLING FLUIDS.
No. 373,564. Patented Nov. 22, 1887.

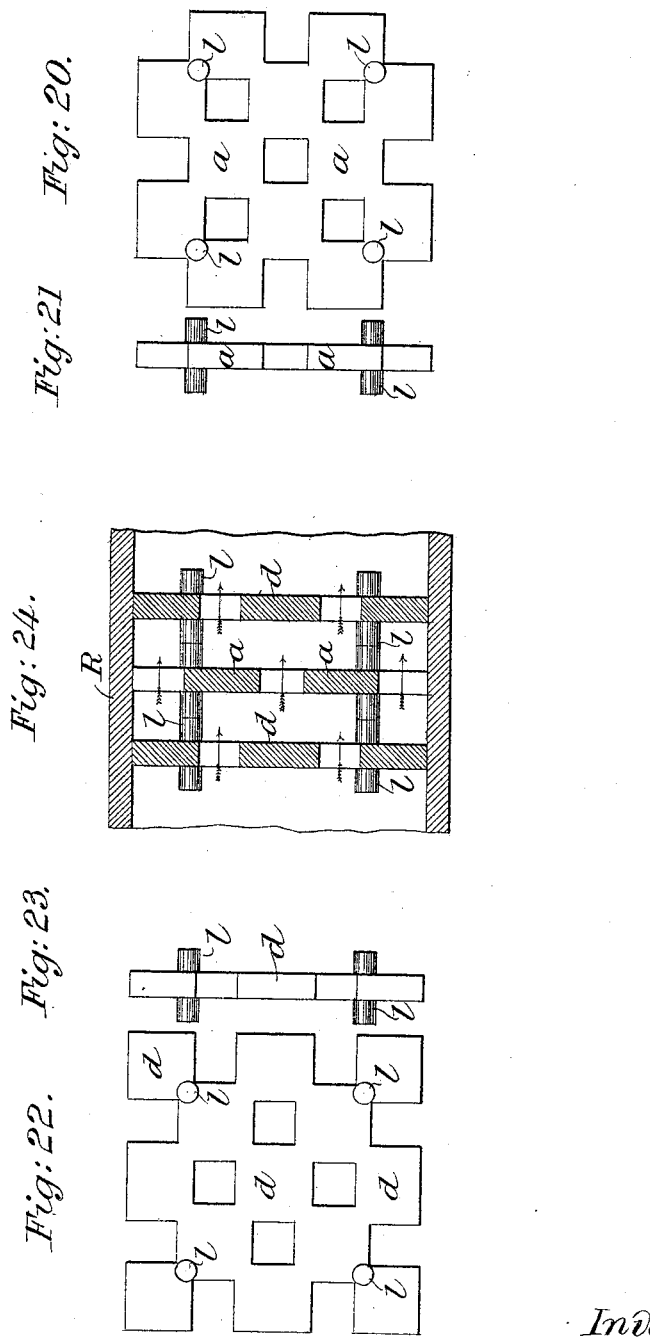

(No Model.) 6 Sheets—Sheet 5.
A. G. MEEZE.
APPARATUS FOR HEATING AND COOLING FLUIDS.
No. 373,564. Patented Nov. 22, 1887.

Witnesses.
Emil Herter.
C. L. Sundgren

Inventor.
Arthur G. Meeze
by attorneys
Brown & Hall

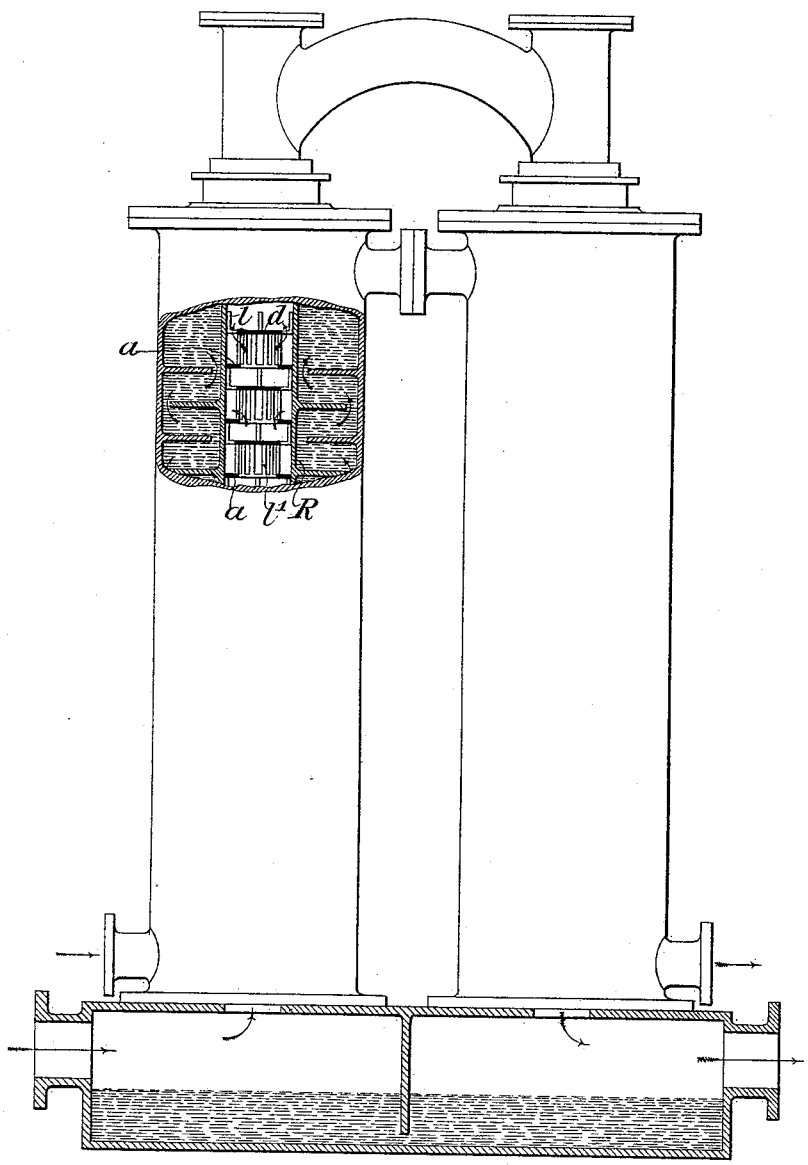

UNITED STATES PATENT OFFICE.

ARTHUR G. MEEZE, OF REDHILL, COUNTY OF SURREY, ENGLAND.

APPARATUS FOR HEATING AND COOLING FLUIDS.

SPECIFICATION forming part of Letters Patent No. 373,564, dated November 22, 1887.

Application filed April 11, 1887. Serial No. 234,356. (No model.)

*To all whom it may concern:*

Be it known that I, ARTHUR GEORGE MEEZE, of Redhill, in the county of Surrey, England, (consulting engineer,) have invented certain new and useful Improvements in Tubular Apparatus for Heating and Cooling Fluids, of which the following is a specification, reference being had to the accompanying drawings.

The object of my invention is, generally speaking, to effect a rapid and efficient exchange of heat between bodies, mostly fluid, separated by tubular partitions, which, when practicable, are made of metal or other good heat-conducting substances. Sometimes the object is to transmit the heat from a more or less rapidly passing current of heated products of combustion to the comparatively stationary water of a boiler. Sometimes the object is to cause the heat of the furnace to be transferred to a current of fluid passing through pipes or retorts for heating, superheating, or thermolytic purposes, while at other times the object is the converse of all this—namely, to remove excessive heat, as in condensing and cooling apparatus. In all these cases it will be observed there is on one side at least of some partition—pipe, retort, or the like—a current of hot or cold fluid which it is desired shall either give heat to or take heat from the partition, and thence to or from the body in contact with the other side thereof.

In order that the current of fluid shall act most efficiently in effecting the transference of heat to or from the surfaces with which it is brought in contact, it is necessary that every part of such fluid be made repeatedly to impinge thereon with considerable velocity and as nearly as may be possible at right angles. In order to produce this impinging action my invention consists in the combination, with a flue, tube, or retort, of a deflector placed therein, and consisting of deflecting-plates and interposed lugs or studs, the said deflecting-plates having so arranged and provided within and around them openings for the passage of the fluid which is required to circulate through the flue, tube, or retort that the solid parts of each plate are opposite the openings in the adjacent plates, and the said studs or lugs being arranged at such distance apart and from the centers of the plates and the inner circumferences or walls of the flue, tube, or retort that the fluid in the latter may circulate toward and from the centers and walls thereof between the said lugs or studs.

It further consists in a novel construction of such deflector, as hereinafter described and claimed.

The invention is illustrated in the accompanying drawings, in which—

Figure 17:
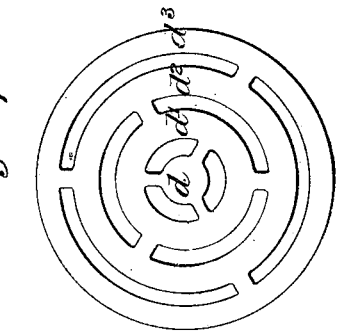
Figure 18:
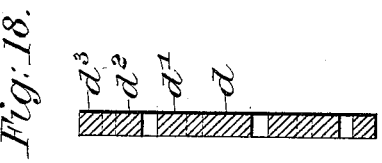
Figure 15:
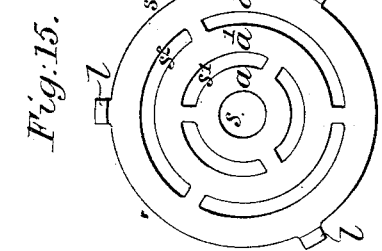
Figure 16:
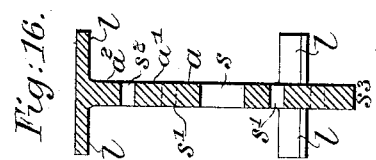
Figure 25:
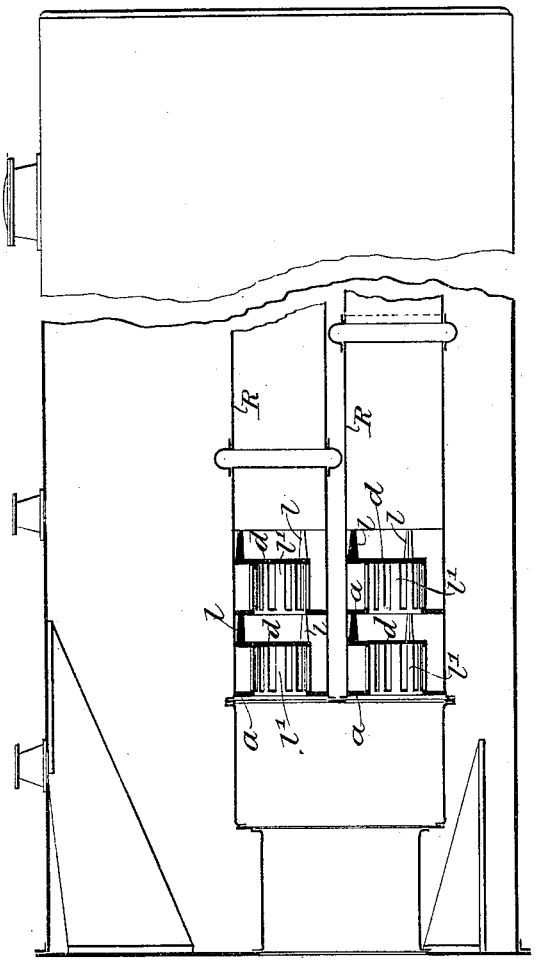
Figure 26:
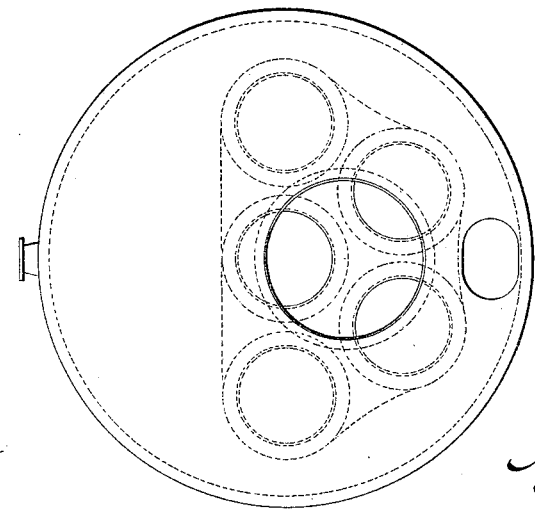

Figures 1, 2, 3, 4, and 5 represent my deflectors in their simplest or most elementary form. Fig. 1 is a central sectional view of one of the circular deflecting-plates of said deflector, and Fig. 2 a face view of the same. Fig. 3 is a face view of the other circular plate of the same deflector, having lugs or studs attached; and Fig. 4 is a central sectional view of the same. Fig. 5 is a sectional view of a portion of a circular tube having such deflectors within it. Figs. 6 and 7 represent, respectively, a central section and a face view of one of the plates of a deflector adapted to a square tube; and Figs. 8 and 9 represent, respectively, a face view and central section of the other plate of the same deflector. Fig. 10 is a central sectional view of a portion of a square tube or retort having such deflectors applied. Fig. 11 is a transverse sectional view of a circular deflector in which the two deflecting-plates and the studs or lugs are integral or cast in one piece. Fig. 12 is an axial sectional view of said deflector, and Fig. 13 is a face view of the same. Fig. 14 is a central sectional view of a portion of a tube fitted with such a deflector. Figs. 15 and 16 are respectively a face view and a central sectional view of one of the plates and attached lugs or studs, illustrating another construction of the deflector in circular form. Figs. 17 and 18 are respectively a face view and a central sectional view of the other plate of the same deflector, and Fig. 19 is a central sectional view of a tube with such central deflector applied. Figs. 20 to 24, inclusive, are views corresponding, respectively, with Figs. 15 to 19, but showing the deflector-plates of square form and fitted to a square tube. Figs. 25 and 26 are respectively a longitudinal sectional view and a front view of a steam-boiler, illustrating the application of my deflectors to the flues thereof. Fig. 27 is an elevation, partly in section, illustrating the application of my invention to a condenser.

Similar letters of reference designate corresponding parts in all the figures.

In its primitive and most elementary form (shown in Figs. 1 to 5) the deflecting-plates consist, first, of an annulus, $a$, against which a portion of the fluid impinges and is diverted, and, second, a disk, $d$, with attached lugs or studs so arranged in juxtaposition with the annulus or, the lugs or studs in contact with the latter, as to provide a surrounding escape-space, $s$, and a central impact-surface, $d$, against which that part of the fluid-current not otherwise diverted by the annulus is compelled to impinge before finally escaping between the lugs or studs $l$ to the next deflector. In thus escaping the fluid, passing between the lugs or studs $l$ on one side of the disk $d$, is caused to strike against the walls of the tube R, by which it is again deflected and caused to pass between the lugs or studs on the other side of said disk and to strike against and pass through the annulus of the next deflector.

In the example of my invention shown in Figs. 6 to 10 the construction and operation are precisely the same, except that the first-described example is attached to a round tube and the other to a square one.

In the example of my deflector shown in Figs. 11 to 14 the two deflecting-plates, consisting of the annulus $a$ and the disk $d$, are united in one piece by the lugs $l'$ $l'$, and there are attached to the disk $d$ lugs or studs $l$ $l$ to produce a proper separation of the disk $d$ from the annulus of the next deflector.

The example of my invention illustrated in Figs. 15 to 19 and that illustrated in Figs. 20 to 24 illustrate substantially the same kind of deflector as is shown in Figs. 1 to 5 and in Figs. 6 to 10, but of a compound construction especially adapted for thermolytic and superheating purposes, the two deflector-plates $a$ $a'$ $a^2$ $d$ $d'$ $d^2$ of which the deflectors are composed being constructed to insure successive impacts.

In the example shown in Figs. 15 to 19 (see particularly Fig. 19) the annuluses $a$ $a'$ $a^2$, against which a portion of the fluid impinges in passing, are arranged concentrically with intermediate concentric apertures, $s$ $s'$ $s^2$ $s^3$, through which the fluid finally escapes, and is thereby deflected so as to impinge upon the disk $d$ and its concentric equivalents $d'$ $d^2$ $d^3$.

When arranged as in Fig. 19, the one section or deflecting-plate consisting of the annular segments $a$ $a'$ $a^2$ is kept at a suitable distance from the other by the lugs $l$ $l$, cast on the former and the latter section or plate is constructed with perforations concentrically placed between the solid parts $d$ $d'$ $d^2$ $d^3$. By this construction I insure the perforations or openings in each deflecting-plate being opposite the solid non-perforated portions of the next deflecting-plate on either side, and thus secure a maximum deflector-surface with a minimum of obstruction.

In the square example illustrated by Figs. 19 to 24, the same alternate arrangement of the openings and solid portions of the alternated deflecting-plates is observed. In the last-mentioned example the studs or lugs $l$, interposed between the deflecting-plates, are provided or each plate so arranged that those on the plate $a$ abut against those on the next one, $d$, on either side. That the deflectors may exert as little choking effect as possible, they are constructed and arranged so that the area of the perforations or opening in one of the two deflecting-plates $a$, that of the space between it and the second plate, $d$, and that of the perforations in the escape-space around the second surface, $d$, are all equal.

Retorts or pipes for superheating and thermolytic purposes when furnished with my deflectors have a vastly-increased efficiency, and the same may be said of tubular condensers, for the current of fluid, instead of being hurried along with a central core comparatively unacted upon, is compelled repeatedly to strike or bombard a number of auxiliary surfaces, hot or cold, as the case may be, as well as the surface of the retort, pipe, tube, &c. These auxiliary surfaces, by absorbing heat from and radiating heat to the surfaces by which they communicate, completely effect the transference of heat to or from the passing current of fluid, the various parts of which become of uniform temperature.

In the application of my invention to boilers I may take any boiler of approved construction and insert in the flues thereof a convenient complement of deflectors; but I prefer to use boilers of the tubular construction. Instead, however, of using a large number of small tubes with the perforations as illustrated in Figs. 25 and 26, a small number of large tubes or flues—as my radial deflectors—are equally efficient steam-generators, while they cost less to fit up and are quite free from the troubles essentially incidental to multitubular bodies.

In bodies heated with Galloway tubes at any angle I may insert deflectors into those tubes, or into the tubes of what are known as "tubular boilers," so as to compel the current of water therein to strike their heated sides.

My invention may be readily adapted to most existing boilers, whether of the horizontal or vertical construction. It may also be adapted to conical or any other shaped flues, whether external or internal.

In all the examples of my invention herein described the deflector consists of two deflecting-plates having provided or arranged with and around them openings for the passage of the fluid which is required to circulate through the flue, tube, or retort, and interposed studs or lugs, the openings in each of the two plates being arranged opposite the solid portions of the other one, and the studs or lugs being arranged at a distance from the centers of the plates and the inner circumference or walls of the flue, tube, or retort in which the deflector is placed, so that the fluid is deflected by the solid parts of each plate and caused to circulate toward and from the center and walls of the tube between the said studs or lugs.

What I claim as my invention, and desire to secure by Letters Patent, is—

1. The combination, with a flue, tube, or retort, of a deflector placed therein and consisting of two deflecting-plates and interposed lugs or studs, the said deflecting-plates having so provided or arranged within and around them openings for the passage of the fluid which is required to circulate through the flue, tube, or retort that the solid parts of each plate are opposite the openings in the adjacent one, and the said studs being arranged at such distance apart and from the centers of the plates and the inner circumference or walls of the flue, tube, or retort that the fluid in the latter may circulate toward and from the centers and walls thereof between the said lugs or studs, substantially as and for the purpose herein described.

2. The combination of the two deflecting-plates consisting of the annulus $a$ and disk $d$, the lugs $l'$, uniting said annulus and disk, and the lugs or studs $l$, attached to the exterior of one of said plates, substantially as and for the purpose herein described.

The 28th day of March, 1887.

ARTHUR G. MEEZE.

Witnesses:
   H. K. WHITE,
   G. H. G. MATHIESON,
*Both of 6 Bream's Buildings, Chancery Lane, London.*